United States Patent [19]
Jensen

[11] Patent Number: 5,861,864
[45] Date of Patent: Jan. 19, 1999

[54] VIDEO INTERFACE SYSTEM AND METHOD

[75] Inventor: Philip E. Jensen, Bellvue, Colo.

[73] Assignee: Hewlett-Packard Company, Palo Alto, Calif.

[21] Appl. No.: 626,735

[22] Filed: Apr. 2, 1996

[51] Int. Cl.$^6$ ........................................ G09G 5/00
[52] U.S. Cl. ............................ 345/115; 345/116; 348/443
[58] Field of Search ........... 345/115–116; 348/445–446, 348/443

[56] References Cited

U.S. PATENT DOCUMENTS

| | | | |
|---|---|---|---|
| 4,745,458 | 5/1988 | Hirano et al. | 348/446 |
| 5,493,299 | 2/1996 | Song et al. | 345/115 |
| 5,510,843 | 4/1996 | Keene et al. | 348/446 |
| 5,557,302 | 9/1996 | Levinthal et al. | 345/115 |

*Primary Examiner*—Richard A. Hjerpe
*Assistant Examiner*—Tracy H. Nguyen

[57] ABSTRACT

A video interface system and method produce an interlaced video signal from a noninterlaced graphics signal produced by a computer. The video interface system receives a digitized noninterlaced graphics signal directly from the graphics system of the computer and converts the graphics signal into an analog interlaced video signal. The noninterlaced graphics signal is characterized by a higher resolution and higher frequency than the analog interlaced video signal. In the preferred embodiment, the video interface is connected to a decoder within the graphics system. The decoder generates and combines timing signals with pixel values from a frame buffer to produce a noninterlaced graphics signal. In architecture, the video interface has an x-filter configured to receive the graphics signal and configured to scale an x-dimension of an image represented by the graphics signal, a y-filter connected to the x-filter for scaling a y-dimension of the image represented by the graphics signal, a cache connected to the y-filter for receiving data from the y-filter at a first rate and for providing the data to the y-filter, a field memory for receiving the data from the cache at a second rate that is slower than the first rate, and a video encoder for receiving data from the field memory at a third rate that is slower than the first and second rates and for providing the analog interlaced video signal.

22 Claims, 20 Drawing Sheets

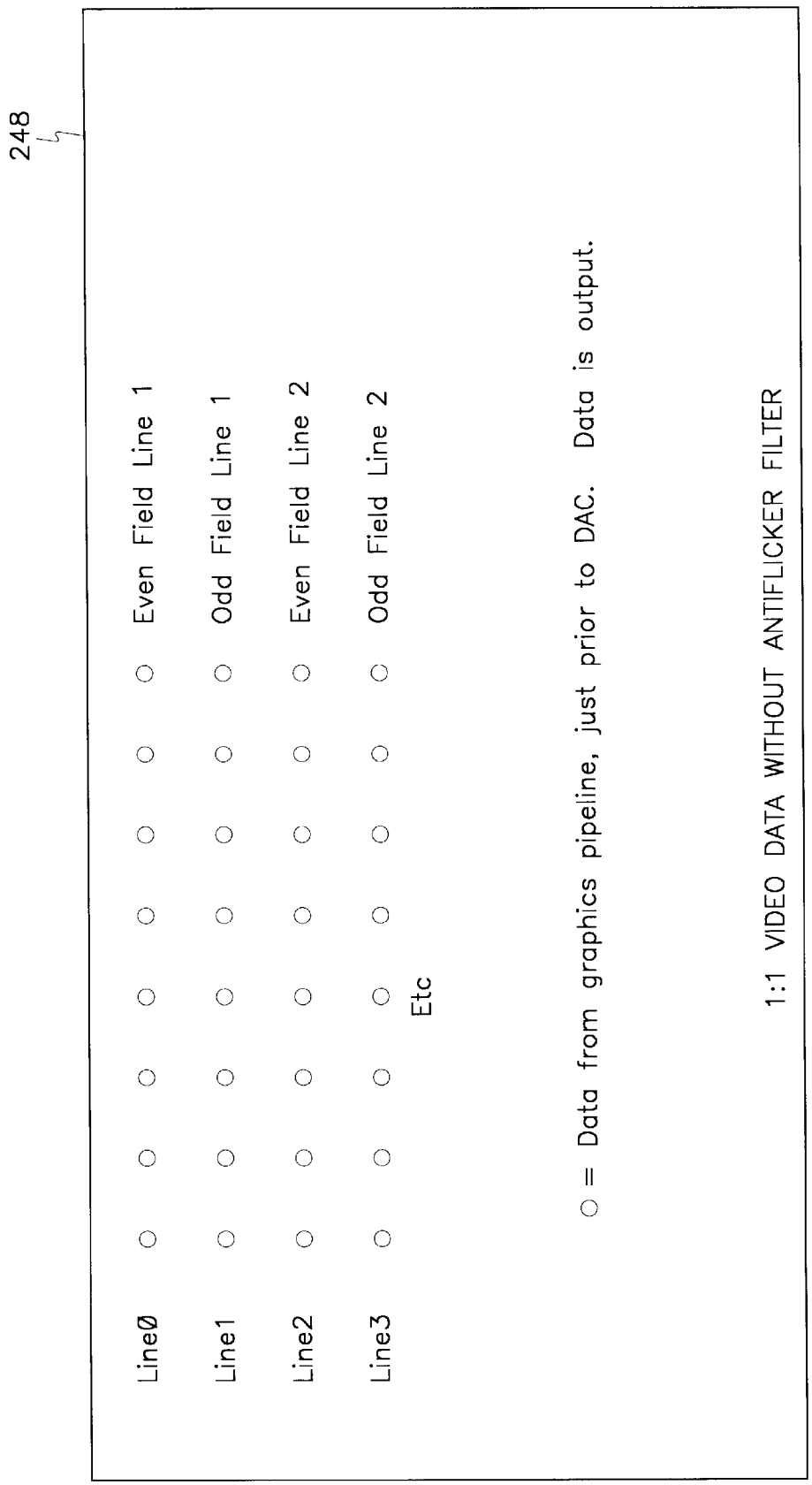

|       |   |   |   |   |   |   |   |   |                   |
|-------|---|---|---|---|---|---|---|---|-------------------|
| Line0 | O | O | O | O | O | O | O | O | Even Field Line 1 |
|       | X | X | X | X | X | X | X | X |                   |
| Line1 | O | O | O | O | O | O | O | O | Odd Field Line 1  |
|       | X | X | X | X | X | X | X | X |                   |
| Line2 | O | O | O | O | O | O | O | O | Even Field Line 2 |
|       | X | X | X | X | X | X | X | X |                   |
| Line3 | O | O | O | O | O | O | O | O | Odd Field Line 2  |
|       | X | X | X | X | X | X | X | X |                   |
| Line4 | O | O | O | O | O | O | O | O |                   |

Etc

O = Data from graphics pipeline, just prior to DAC. Data is not output.
X = Averaged data from previous and next lines. Average is accomplished with an 8 bit addition of each component (r,g and b) resulting in a 9 bit value. The LSB is then discarded. Data is output.

1:1 VIDEO DATA WITH ANTIFLICKER FILTER

Fig. 13B

|  |  |  |  |  |  |  |  |  | |
|---|---|---|---|---|---|---|---|---|---|
| Line0 | ● | ○ | ⊗ | ○ | ● | ○ | ⊗ | ○ | ● Even Field Line 1 |
| Line1 | ○ | ⊗ | × | ○ | ○ | ⊗ | × | ○ | |
| Line2 | ○ | × | ⊗ | ○ | ○ | × | ⊗ | ○ | ○⊗○ Odd Field Line 1 |
| Line3 | ● | ○ | ⊗ | ○ | ● | ○ | ⊗ | ○ | ● Even Field Line 2 |

Etc

○ = Data from graphics pipeline, just prior to DAC. Data is not output.
● = Data output to video encoder.
× = Averaged data from previous and next lines. Average is accomplished with an 8 bit addition of each component (r,g and b) resulting in a 9 bit value. The LSB is then discarded. Data is not output.
⊗ = Averaged data from previous and next lines. Average is accomplished with an 8 bit addition of each component (r,g and b) resulting in a 9 bit value. The LSB is then discarded. Data is output.

1.5:1 VIDEO DATA WITHOUT ANTIFLICKER FILTER

Fig. 14A

|       |   |           |   |   |           |   |   |           |   |   |           |   |   |           |                    |
|-------|---|-----------|---|---|-----------|---|---|-----------|---|---|-----------|---|---|-----------|--------------------|
| Line0 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○ Even Field Line 1 |
| Line1 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○                  |
| Line2 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○ Odd Field Line 1  |
| Line3 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○                  |
| Line4 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○ Even Field Line 2 |
| Line5 | ○ | ×<br>⊗<br>× | ○ | ○ | ×<br>⊗<br>× | ○ | ○ | ×<br>⊗<br>× | ○ | ○ | ×<br>⊗<br>× | ○ | ○ | ×<br>⊗<br>× | ○                  |

Etc

○ = Data from graphics pipeline, just prior to DAC. Data is not output.
× = Averaged data from previous and next lines. Average is accomplished with an 8 bit addition of each component (r,g and b) resulting in a 9 bit value. The LSB is then discarded. Data is not output.
⊗ = Averaged data from previous and next lines. Average is accomplished with an 8 bit addition of each component (r,g and b) resulting in a 9 bit value. The LSB is then discarded. Data is output.

2:1 VIDEO DATA WITHOUT ANTIFLICKER FILTER

2:1 VIDEO DATA WITH ANTIFLICKER FILTER

○ = Data from graphics pipeline, just prior to DAC. Data is not output.
× = Averaged data from previous and next lines. Average is accomplished with an 8 bit addition of each component (r,g and b) resulting in a 9 bit value. The LSB is then discarded. Data is not output.
⊗ = Averaged data from previous and next lines. Average is accomplished with an 8 bit addition of each component (r,g and b) resulting in a 9 bit value. The LSB is then discarded. Data is output.

VIDEO INTERFACE SYSTEM AND METHOD

FIELD OF THE INVENTION

The present invention relates generally to computer graphics systems and video signals, and more particularly, to a video interface system and method for producing a low resolution, low frequency, interlaced video signal that conforms to typical television video standards with a computer that produces a high resolution, high frequency, noninterlaced graphics signal.

BACKGROUND OF THE INVENTION

Typical television video standards include NTSC, PAL, and SECAM. The NTSC standard has been adopted in, for example, the United States and Japan. The NTSC standard provides for an interlaced image with an image resolution of 640×480 pixels, or 320×240 pixels. An "interlaced" image is one where the odd and even horizontal lines of the image are updated on alternate frame refresh cycles. The odd and even fields are updated at about 30 hertz (Hz), and the image is, as a whole, is fully updated at a rate of about 60 Hz, which corresponds to the alternating current (AC) power supply cycle in the U.S. and Japan. Further, the data stream that carries the interlaced image is fed to a video display, such as a television monitor, via a pixel, or dot, clock operating at about 27 megahertz (MHz).

The PAL and SECAM video standards have been adopted other places in the world, including for example, Europe. The PAL/SECAM television video standards provide for an interlaced image with a typical resolution of 768×565, or 384×283 pixels. The odd and even fields are updated at about 25 Hz, and the image, as a whole, is fully updated at a rate of about 50 Hz, which corresponds to the AC power supply cycle in these countries. Moreover, the data stream is fed to a video display via a pixel clock operating at about 27 MHz.

In contrast to the NTSC, PAL, and SECAM video standards, a typical computer generated image is noninterlaced, can have a much higher resolution, and is usually generated by a data stream having a much higher frequency, or pixel (dot) clock. As an example, a typical resolution is 1280×1024 pixels, and a common pixel clock operates at about 135 MHz, which is more than four times that of the usual interlaced video pixel clocks.

It is oftentimes desirable to produce an interlaced video signal from a noninterlaced computer graphics signal. More specifically, engineering designs, particularly, animated designs, are often produced on workstations or high end computers that generate high resolution, high frequency, noninterlaced computer graphics signals for driving a computer graphics display. Further, it may be desirable to show the animated design on a low cost conventional video cassette recorder (VCR) or other device that utilizes the NTSC, PAL, or SECAM video standard. In order to accomplish this functionality, several approaches have been utilized.

One approach, called the Folsom technique or the Lyon-Lamb technique, involves capturing the computer generated analog signal passing from a graphics system to the computer graphics display. This technique is shown in FIG. 1A and generally denoted by reference numeral 11. With reference to FIG. 1, the system 11 includes a central processing unit (CPU) 12 interconnected as indicated by reference arrow 13 with a graphics system 14, which is in turn interconnected with a computer display 16. The graphics system 14 drives a high resolution, high frequency, noninterlaced analog signal to the computer display 16, as indicated by reference arrows 15, 15a. In accordance with the Folsom or Lyon-Lamb technique, a video processing system 18 is interconnected with the graphics system 14 to receive the analog noninterlaced video signal, as indicated by reference arrows 15, 15b. The video processing system 18 includes, among other things, an analog-to-digital converter (ADC), a frame buffer, and a processor for controlling the foregoing elements in order to generate a low resolution, low frequency, interlaced video signal 21. Although meritorious to an extent, this system 11 is expensive as the video processing system 18 must deal with a high frequency analog signal. Further, there is degradation in data in that the source data is transformed from digital to analog and then back to digital again.

Another approach involves capturing a digitized noninterlaced graphics signal directly from the CPU, prior to processing by the computer's graphics system. This technique is illustrated in FIG. 1B and generally denoted by reference numeral 31. Referring to FIG. 1B, a video processing system 33, for example, an EISA video out card, is interconnected to the CPU 12, as indicated by reference arrow 13b in order to capture the high resolution, high frequency, noninterlaced graphics signal. The video processing system 33 includes, among other things, a frame buffer and processor, which in combination produce the low resolution, low frequency, interlaced video signal 21.

This approach has little merit in that the video processing system 33 cannot take advantage of the accelerators that are typically employed in the graphics system 14. Accelerators are used to implement, for example, translation, rotation, shading, texture mapping, etc. Furthermore, the video processing system 33 cannot acquire the contents of the frame buffer in the graphics system 14 in real time, i.e., in a fast enough time to generate the video signal 21. One reason is that typical graphics system 14 are designed so that data can be written fast to the graphics system 14, but read very slow from the graphics system 14. Moreover, such a transfer would require at least one iteration of write and read operations, which would obviously slow the transfer.

Another problem associated with the aforementioned approaches involves a phenomenon known as "flickering" in the generated interlaced video signal. When an interlaced image is created from a noninterlaced graphics signal, the interlaced image is oftentimes characterized by pixels that appear to strobe, or flicker. This predicament results from low resolution details being visible in an odd field, but not the even field, or vice versa. An example would include a single horizontal line disposed on an even line. In this example, the line would be generated during even field production, but not during odd field production. Thus, the high intensity data would appear to flicker.

SUMMARY OF THE INVENTION

An object of the present invention is to overcome the inadequacies and deficiencies of the prior art as discussed previously in the background section.

Another object of the present invention is to provide a video interface system and method for producing an interlaced video signal from a computer.

Another object of the present invention is to provide an interface system and method for inexpensively producing a video signal from a computer that conforms to the NTSC, PAL, or SECAM video standards.

Another object of the present invention is to provide a video interface system and method for generating an interlaced video signal from a computer without flickering artifacts.

Briefly described, the present invention provides for a video interface system and method for producing an interlaced video signal from noninterlaced graphics signal from a computer. In accordance with the video interface system, a video signal is extracted directly from a graphics system of a computer. The video interface system receives a digitized noninterlaced graphics signal from the graphics system and converts the noninterlaced graphics signal into an analog interlaced video signal.

The noninterlaced graphics signal can be characterized by a higher resolution and higher frequency than the analog interlaced video signal. In the preferred embodiment, the noninterlaced graphics signal is clocked at the dot clock frequency, for example but not limited to, 135 MHz, and the interlaced video signal is clocked at the dot clock frequency divided by some integer value, for example but not limited to, 27 MHz, which corresponds to the NTSC, PAL, and SECAM video standards.

In the preferred embodiment, the video interface is connected to a decoder, or back end processor, within the graphics system. In general, the decoder generates and combines timing signals with pixel values from a frame buffer to produce a noninterlaced graphics signal. In architecture, the video interface has an x-filter configured to receive the graphics signal and configured to scale an x-dimension of an image represented by the graphics signal. The video interface further includes a y-filter connected to the x-filter for scaling a y-dimension of the image represented by the graphics signal. The y-filter can be equipped with an antiflicker filter that combines (e.g., averages) pixel values corresponding with successive horizontal lines in the image represented by the digitized noninterlaced graphics signal in order to create data for said interlaced video signal and modify said interlaced video signal to produce said image without flicker. A cache is connected to the y-filter for receiving data from the y-filter at a first rate and for providing the data to the y-filter. A field memory receives the data from the cache at a second rate that is slower than the first rate. A video encoder receives data from the field memory at a third rate that is slower than the first and second rates and provides the analog interlaced video signal. In addition to achieving all of the aforementioned objects, the video interface system and method have many other advantages, a few of which are delineated hereafter as examples.

An advantage of the video interface system is that it is simple in design, reliable and efficient in operation, and capable of inexpensive mass production.

Another advantage of the interface system is that there is no performance penalty in producing the interlaced video signal.

Another advantage of the video interface system is that it permits inexpensive image scaling. In fact, the video interface system provides the ability to implement several different size scaling capabilities.

Another advantage of the video interface system is that it employs a flicker filter, which is generally essential to providing a useable video out capability for MCAD (mechanical computer assisted drawing) or AEC (architectural engineering computing) applications. In this regard, the system preferably implements line averaging to reduce flickering.

Another advantage of the video interface system is that it is user friendly and flexible.

Other objects, features, and advantages of the present invention will become apparent to one with skill in the art upon examination of the following drawings and detailed description. It is intended that all such additional objects, features, and advantages be included herein within the scope of the invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating principles of the present invention. Further, like reference numerals designate corresponding parts throughout the several views.

FIG. 13A is a schematic diagram showing 1:1 video data that is output by the video interface system of FIG. 2 when the 1:1 state machine of FIG. 9 without the antiflicker filter is employed;

FIG. 13B is a schematic diagram showing 1:1 video data that is output by the video interface system of FIG. 2 when the 1:1 state machine of FIG. 9 with the antiflicker filter is employed;

FIG. 14A is a schematic diagram showing 1.5:1 video data that is output by the video interface system of FIG. 2 when the 1.5:1 state machine of FIG. 10 without the antiflicker filter is employed;

FIG. 15A is a schematic diagram showing 2:1 video data that is output by the video interface system of FIG. 2 when the 2:1 state machine of FIG. 12 without the antiflicker filter is employed; and FIG. 15B is a schematic diagram showing 2:1 video data that is output by the video interface system of FIG. 2 when the 2:1 state machine of FIG. 12 with the antiflicker filter is employed.

DETAILED DESCRIPTION OF THE PREFERRED EMBODIMENT

Figure 1A:
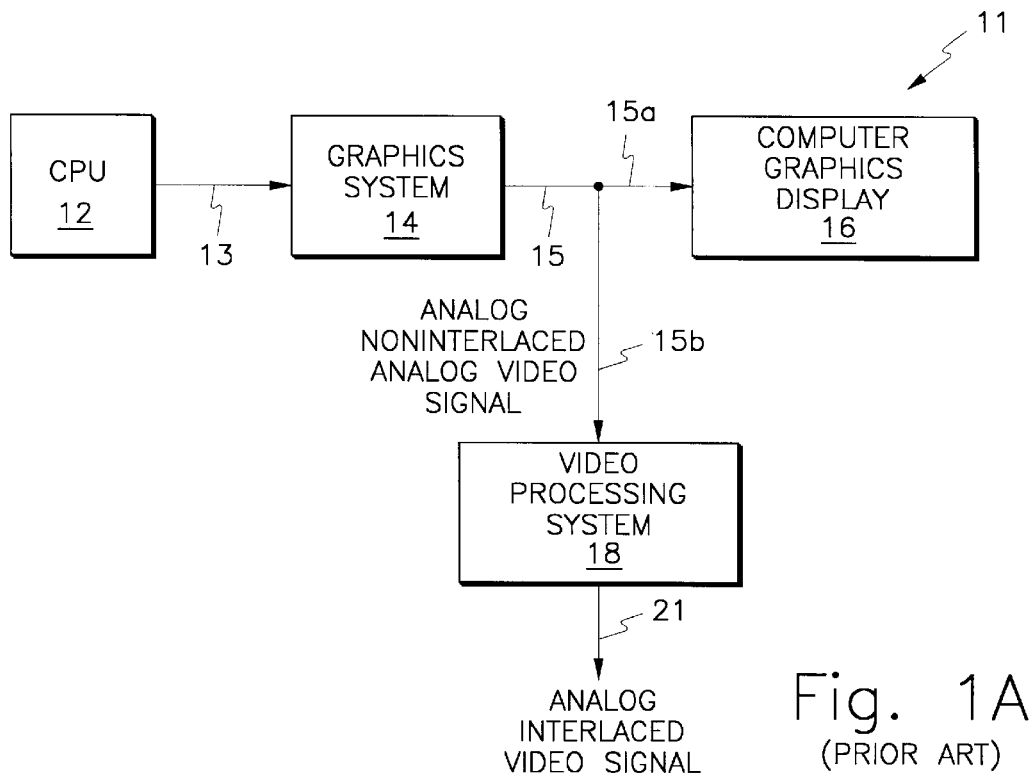
FIG. 1A is a block diagram of a first prior art embodiment for producing an interlaced video signal from a computer.
Figure 1B:
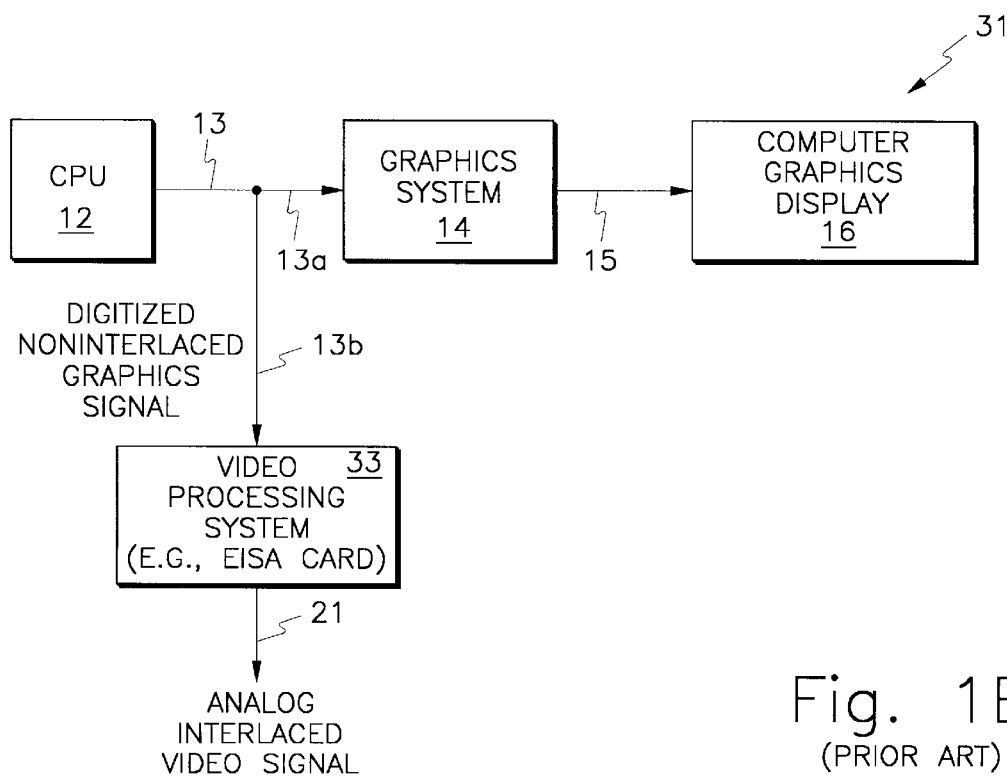
FIG. 1B is a block diagram of a second prior art embodiment for producing an interlaced video signal from a computer.
Figure 2:
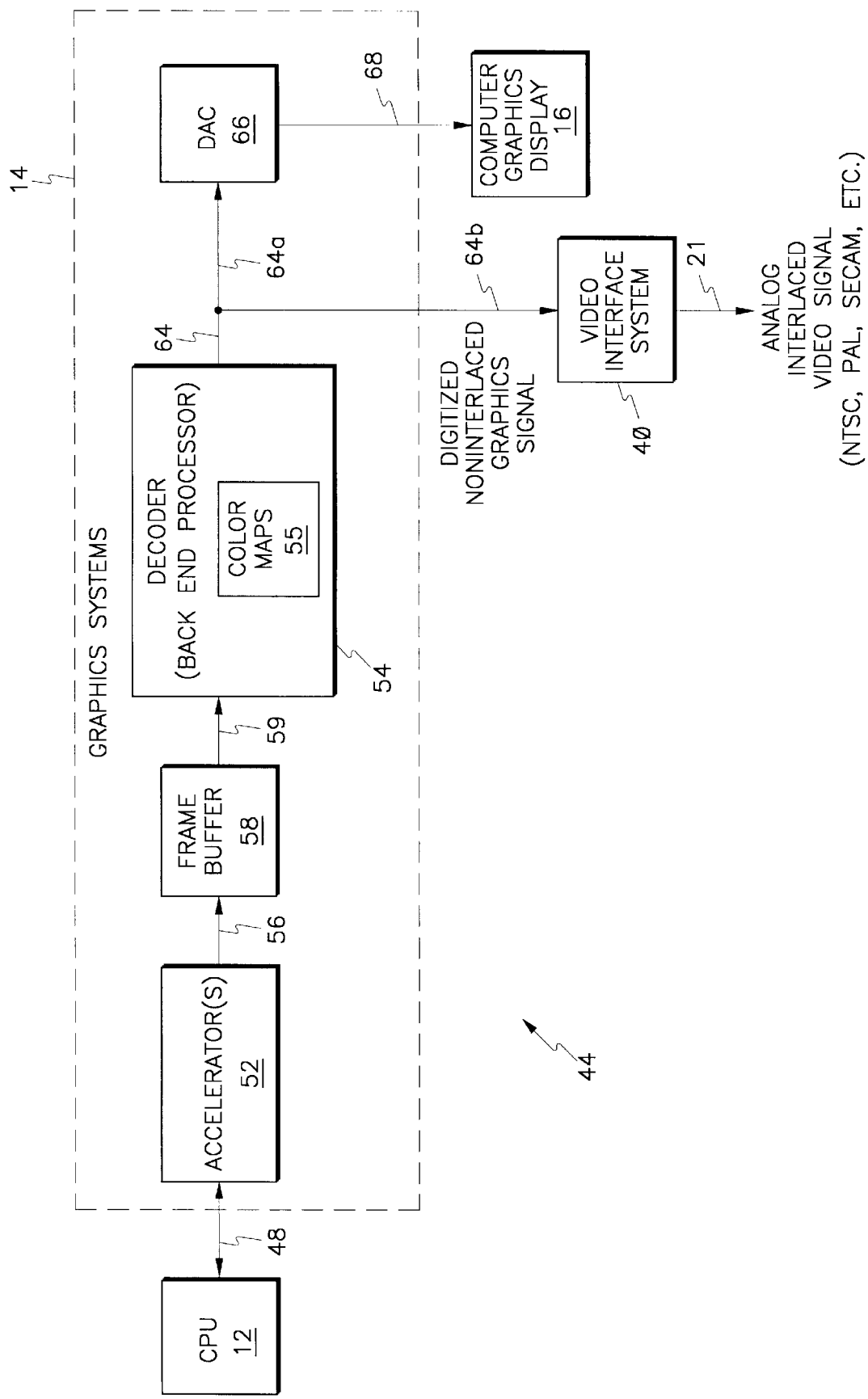
FIG. 2 is a block diagram of the video interface system of the present invention.

A video interface system 40 of the present invention is shown in FIG. 2. With reference to FIG. 2, the video interface system 40 receives a noninterlaced graphics signal 64b from a graphics system 14 of a computer 44 having a central processing unit (CPU) 12 and produces an interlaced video signal 21 that conforms to a conventional television video standard, for example, but not limited to, the NTSC, PAL, SECAM, etc. The interlaced video signal 21 is at a lower resolution and lower frequency than the noninterlaced graphics signal 64b.

In architecture, the computer 44 includes the CPU 12, the graphics system 14 interconnected with the CPU 12 as indicated by reference arrow 48, a computer graphics display 16 interconnected with the graphics system 14 for displaying a high resolution, high frequency, computer generated image, and the novel video interface system 40 interconnected with the graphics system 14. The graphics system 14 includes an accelerator(s) (two dimensional and/or three dimensional) 52 for processing the image primitives, for example, polygons or triangles, and producing pixel values therefrom. Other mechanisms (not shown for simplicity) may be employed in connection with the accelerator(s) 52 to perform quantization (such as truncation), dithering, rasterization, and/or other subprocessing functionality.

A frame buffer 58 is configured to receive the pixel values 56 from the accelerator(s) 52. The frame buffer 58 typically stores one or more planes of display data. More than one plane enables overlays on the display 16.

The decoder 54, which has color maps 55, is connected to the frame buffer 58, and generally, the decoder 54 further processes the pixel values 59 and combines timing and synchronization information with the pixel values 59. The color values that are input to the decoder 54 are used as indices into the color maps 55, which are generally color look-up tables, for determining the actual color to illuminate each pixel. Sometimes, correction parameters (e.g., gamma function) are built into the color maps 55 to correct for nonlinearities in the display device. A digital-to-analog converter (DAC) 66 receives the digital noninterlaced graphics signal 64 from the decoder 54 and converts it into an analog noninterlaced graphics signal 68 for driving the computer graphics display 16. Significantly, the digital noninterlaced graphics signal 64 from the decoder 54 is also forwarded to the novel video interface system 40, as indicated by reference arrow 64b, which in turn produces an analog interlaced video signal 21 that conforms to the NTSC, PAL, or SECAM television video standards.

Figure 3:
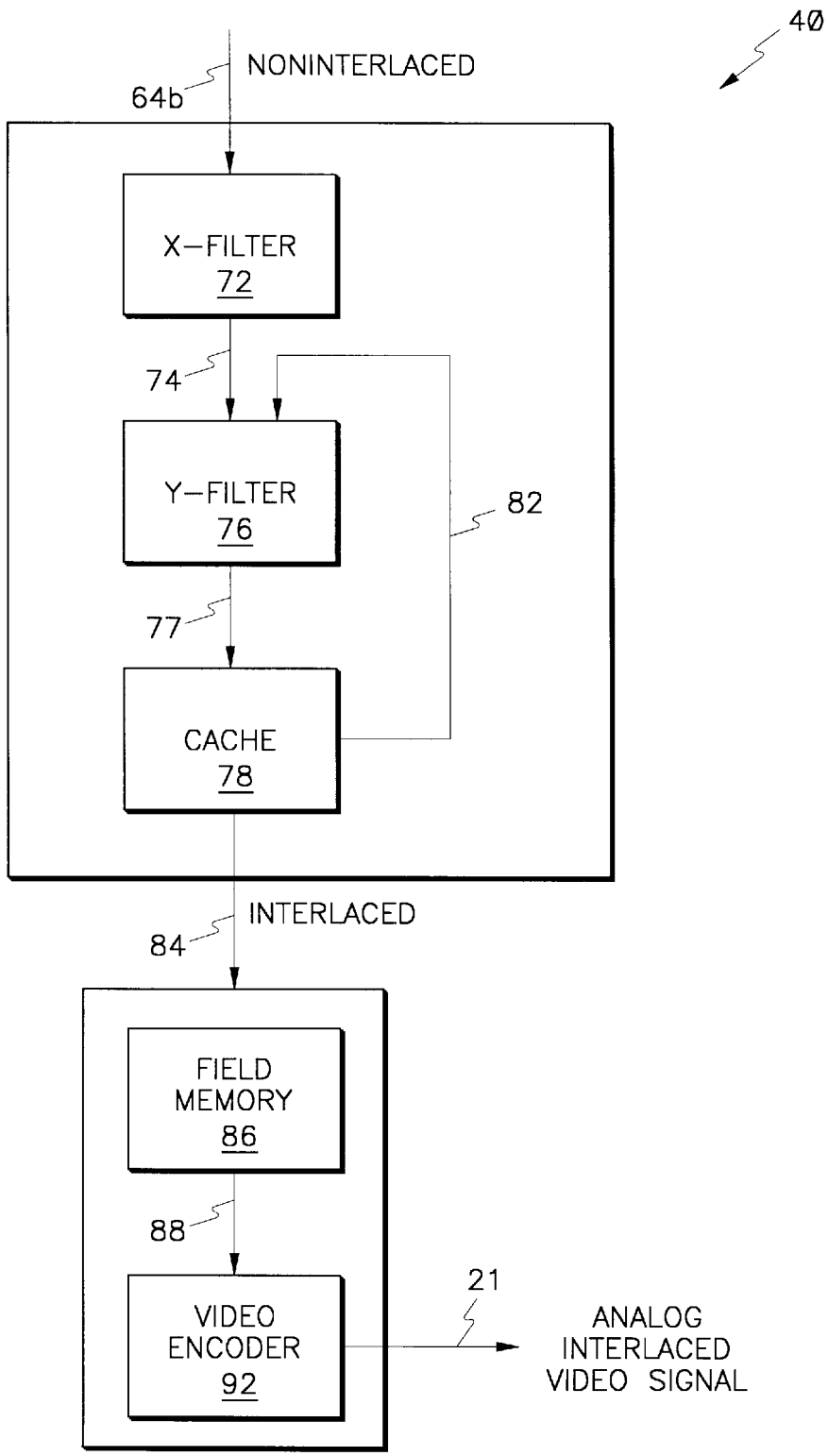
FIG. 3 is a block diagram of the video interface system of FIG. 2.

As shown in FIG. 3, the video interface system 40 includes an x-filter 72 for receiving the noninterlaced graphics signal 64b from the graphics system 14 (FIG. 2). The x-filter 72 is used to scale the image generated by the data 64b in the x-dimension of the image, if desired. The functionality of the x-filter 72 will be better understood after a discussion hereinafter relative to the low level block diagrams in FIGS. 5A and 5B and the state diagram of FIG. 6. A y-filter 76 is connected to the x-filter 72 and is configured to scale the image defined by the signal 64b in a y-dimension of the image. A cache 78 is interconnected with the y-filter 76, as indicated by reference arrow 77. The cache 78 is preferably a random access memory (RAM) with a resolution of 768×n, where n is the number of bits used to describe the color element (e.g., n=24 bits for 8 bits of red, green, and blue), with three ports, one being in and two being directed out. The cache 78 serves as an intermediate stage for reducing the frequency of the signal 64b and further enables the y-filter 76 to process and combine successive horizontal lines. The cache 78 receives horizontal lines, as indicated by reference arrow 77, and returns horizontal lines to the y-filter 76, as needed, as indicated by reference numeral 82. In the preferred embodiment, the cache 78 receives data at the pixel, or dot, clock frequency of about 135 megahertz (MHz) and outputs an interlaced graphics signal 84 at the dot clock frequency divided by an integer value, for example but not limited to, 45 MHz, as indicated by reference arrow 84.

A field memory 86 receives the interlaced graphics signal 84 from the cache 78 at the dot clock divided by an integer value, or about 45 MHz in the preferred embodiment. The field memory 86 is essentially the frame buffer for the video signal 21 that conforms to the NTSC, PAL, or SECAM video standard. The field memory 86 outputs the interlaced graphics signal, as indicated by reference arrow 88, at a rate of about 27 MHz.

A video encoder 92 receives the interlaced graphics signal from the field memory 86 and converts it into an analog video signal 21 for driving a video display or other suitable device. In the preferred embodiment, the video encoder 92 is a model 7199 encoder produced by Phillips Corporation, U.S.A. The field memory 86 prevents tearing of an image by preventing writing to the even/odd field when the video encoder 92 is reading from the even/odd field. The video encoder 92 may also include image processing functionality, for instance, systems for adjustment of brightness, contrast, etc.

Figure 4:
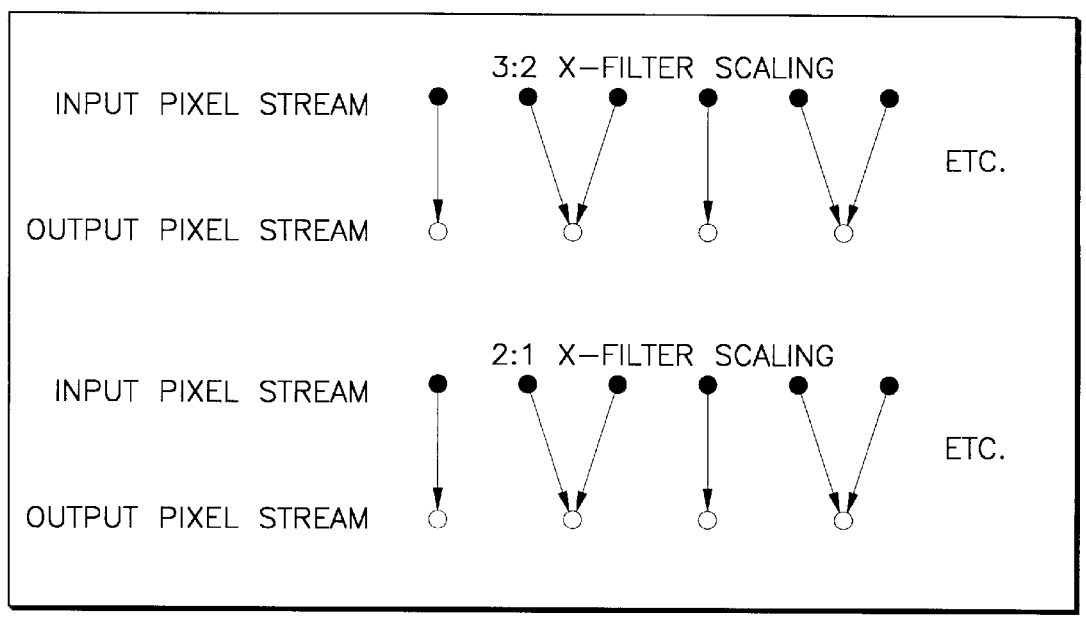
FIG. 4 is a schematic diagram showing scaling that is performed within the x-filter of FIGS. 3 and 4.

As is illustrated schematically in FIG. 4, the function of the x-filter 72 is to take the input data stream 64b and reduce it by a factor of either 3:2 or 2:1 or other ratios that may be generated using integer ratios through a combination of allowing pixels to pass straight through and taking two successive pixels and averaging their values. Scaling by a factor of 3:2 is accomplished by first sending one pixel straight through followed by averaging the next two pixels, and then repeating this function. In contrast, scaling by a factor of 2:1 is easily performed by averaging every two pixels.

It should be noted that because a data line is displayed in its totality during the odd and even scans, it is not necessary to perform any antiflickering function on the x data stream.

Figure 5A:
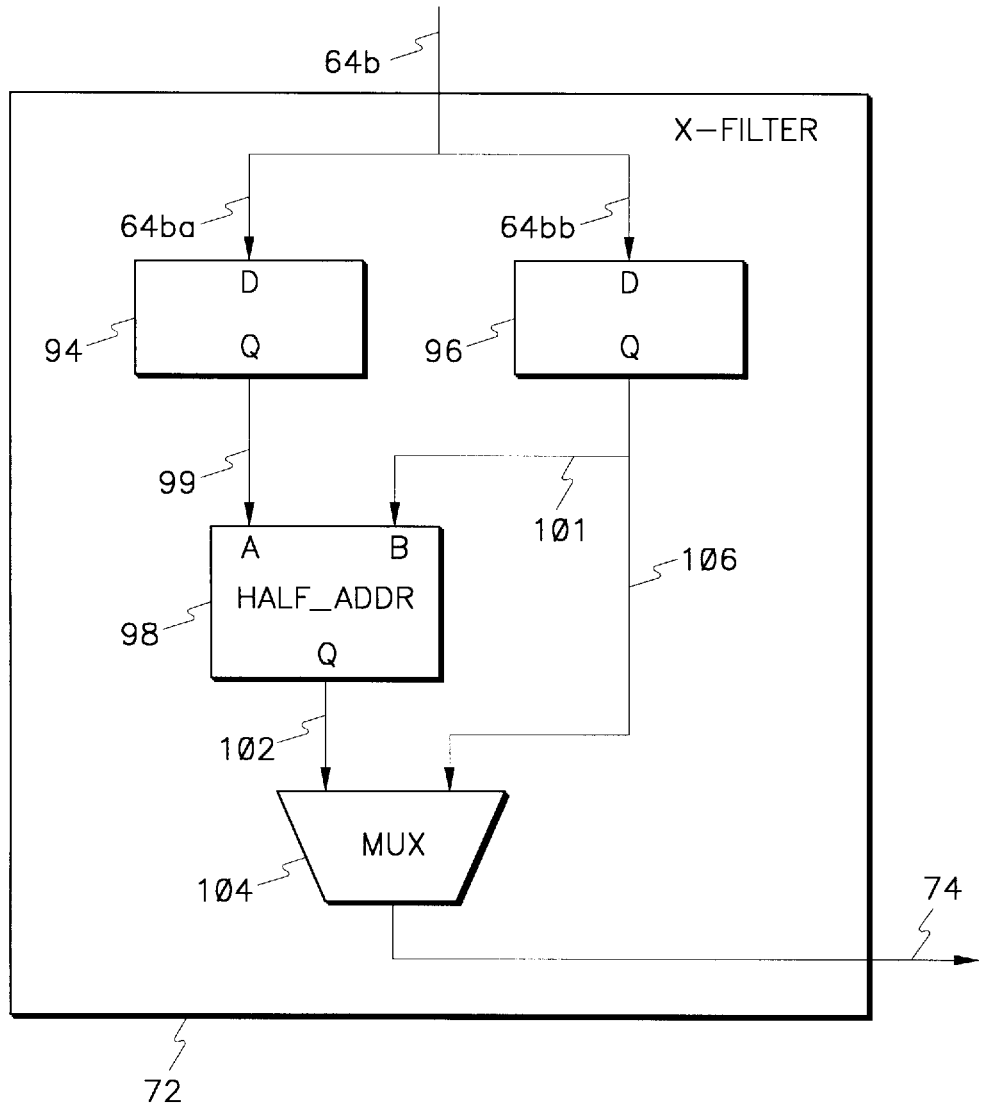
FIGS. 5A and 5B show block diagrams of a possible implementation of the x-filter FIG. 3.
Figure 5B:
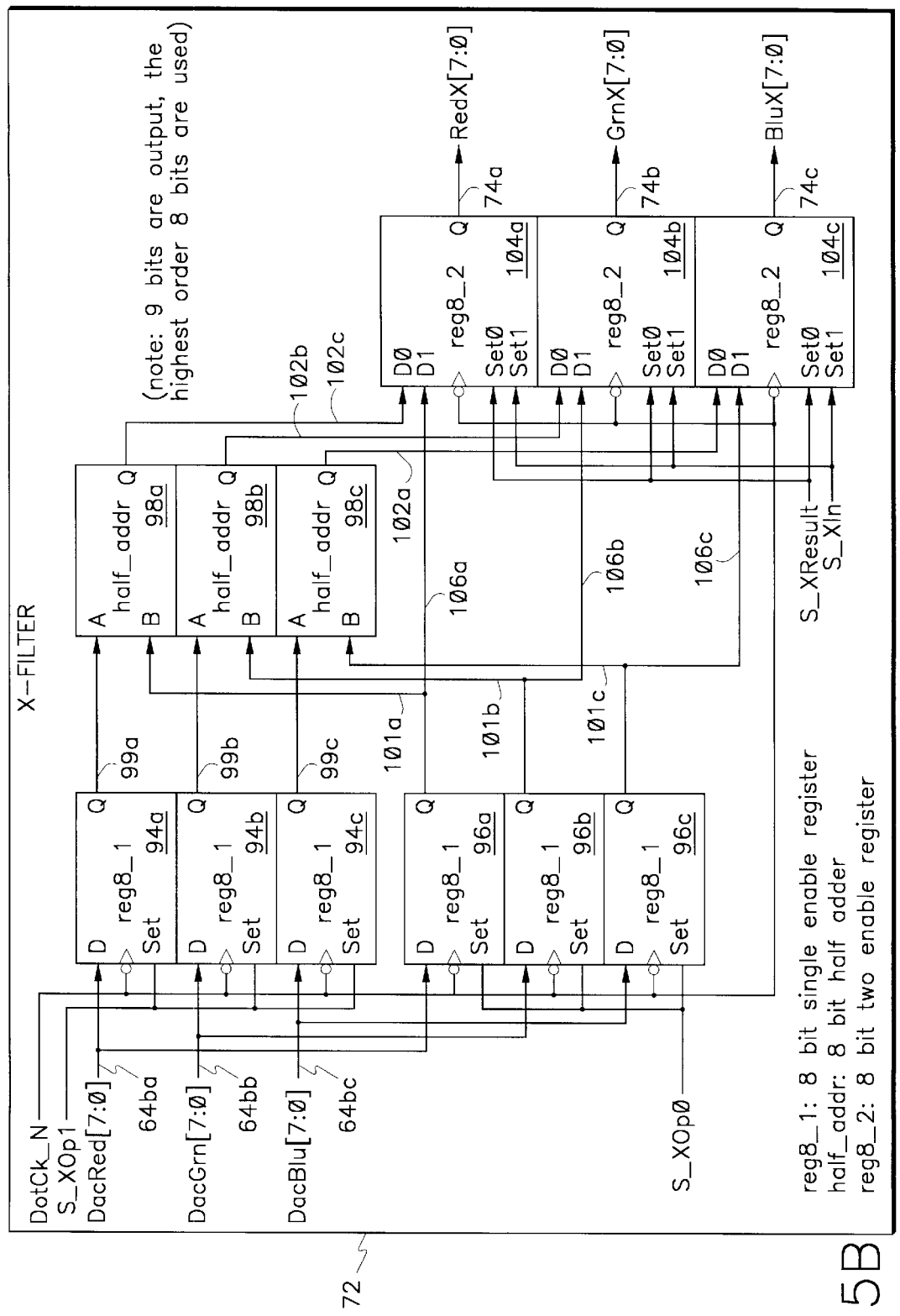

A possible implementation of the x-filter is illustrated in FIGS. 5A and 5B. As shown in FIGS. 5A and 5B, the x-filter 72 includes data latches 94, 96 for receiving successive data bits from the signal 64b, as denoted by respective arrows 64ba, 64bb. A half adder 98 is disposed to receive the data bits from data latches 94, 96, as indicated by reference arrows 99, 101. During each cycle, the half adder 98 produces a data bit 102 that represents the average of the input bits 99, 101. A multiplexer (MUX) 104 receives the output 102 from the half adder 98 and also the output 106 from the data latch 96. The MUX 104 is controlled to output a data stream 74 that represents the data 102 from the half adder 98 or the data 106 from the data latch 96 during each cycle. In the case of a scaling of 3:2, the MUX 104 is controlled to output the data 102 and 106 on alternate cycles. In the case of a 2:1 scaling, the MUX 104 is controlled to output only the data 102 from the half adder 98 during each cycle.

Figure 6:
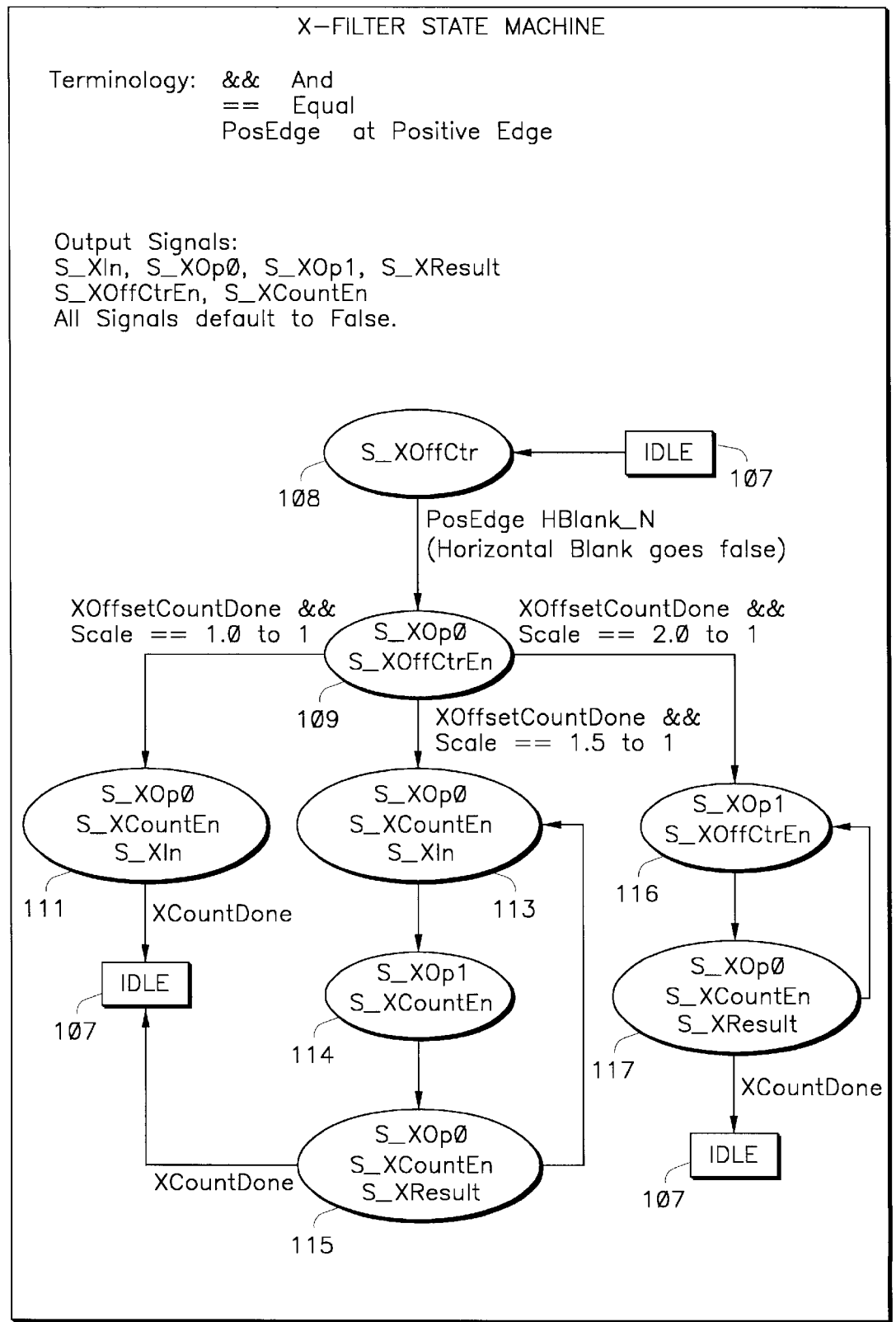
FIG. 6 is a state diagram of a possible implementation of the x-filter of FIGS. 3 and 5.

The x-filter 72 can be controlled by any suitable logic mechanism. In the preferred embodiment, the x-filter 72 is controlled by an x-filter state machine 108, as shown in detail in FIG. 6. The notation utilized in the x-filter state machine 108 of FIG. 6 is defined in Table A hereafter.

TABLE A

| X-Filter State Machine Notation | |
|---|---|
| S_XOp0=TRUE | Load value in op 0 register |
| S_XOp1=TRUE | Load value in op 1 register |
| S_XIn=TRUE | Load output register with value of op 0 register |
| S_XResult=TRUE | Load output register with result of addition operation |
| S_XOffCtrEn=TRUE | Enable X Offset counter |
| S_XCountEn=TRUE | Enable X position counter |

The x-filter 72 can operate in several configurations based on the combination of unfiltered and averaged pixels. Referring to FIG. 6, in the state machine 108, a wait or idle state 107 allows pixels to be loaded until a predefined edge (preferably, positive edge) of horizontal blank (hblank) is reached. This event occurs at the beginning of a line. A counter is then used to hold off data until the region of interest on the line is reached, as indicated by states 108, 109. At this point, a repetitive state is entered until the end of the line is reached. If the scaling is 1:1, then data is passed straight through until the end of line is reached, as indicated by state 111, at which point it proceeds back to the wait state 107. When scaling is 1.5:1 (3:2), then the first pixel is passed straight through, pursuant to state 113, followed by two input pixels which are averaged together, in accordance with states 114–115, until the end of line is encountered. In the case when 2:1 scaling is enabled, one pixel is stored, as indicated at state 116, and then this one pixel is averaged with the next pixel and the result is output, pursuant to state 117. Finally, state 117 transfers to the idle state 107 to await another positive edge of an hblank.

Figure 7A:
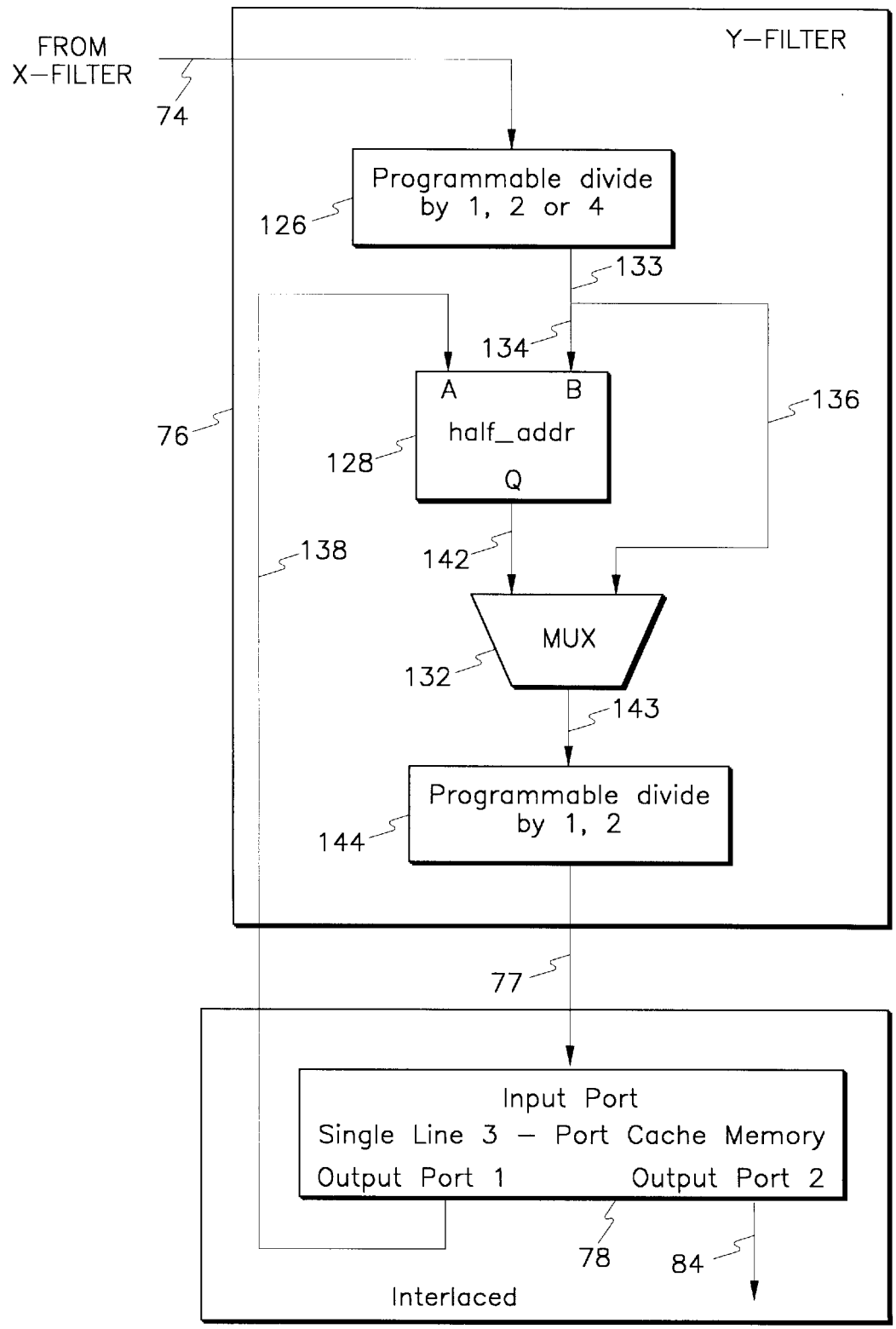
FIGS. 7A and 7B show block diagrams of a possible implementation of the y-filter FIG. 3.
Figure 7B:
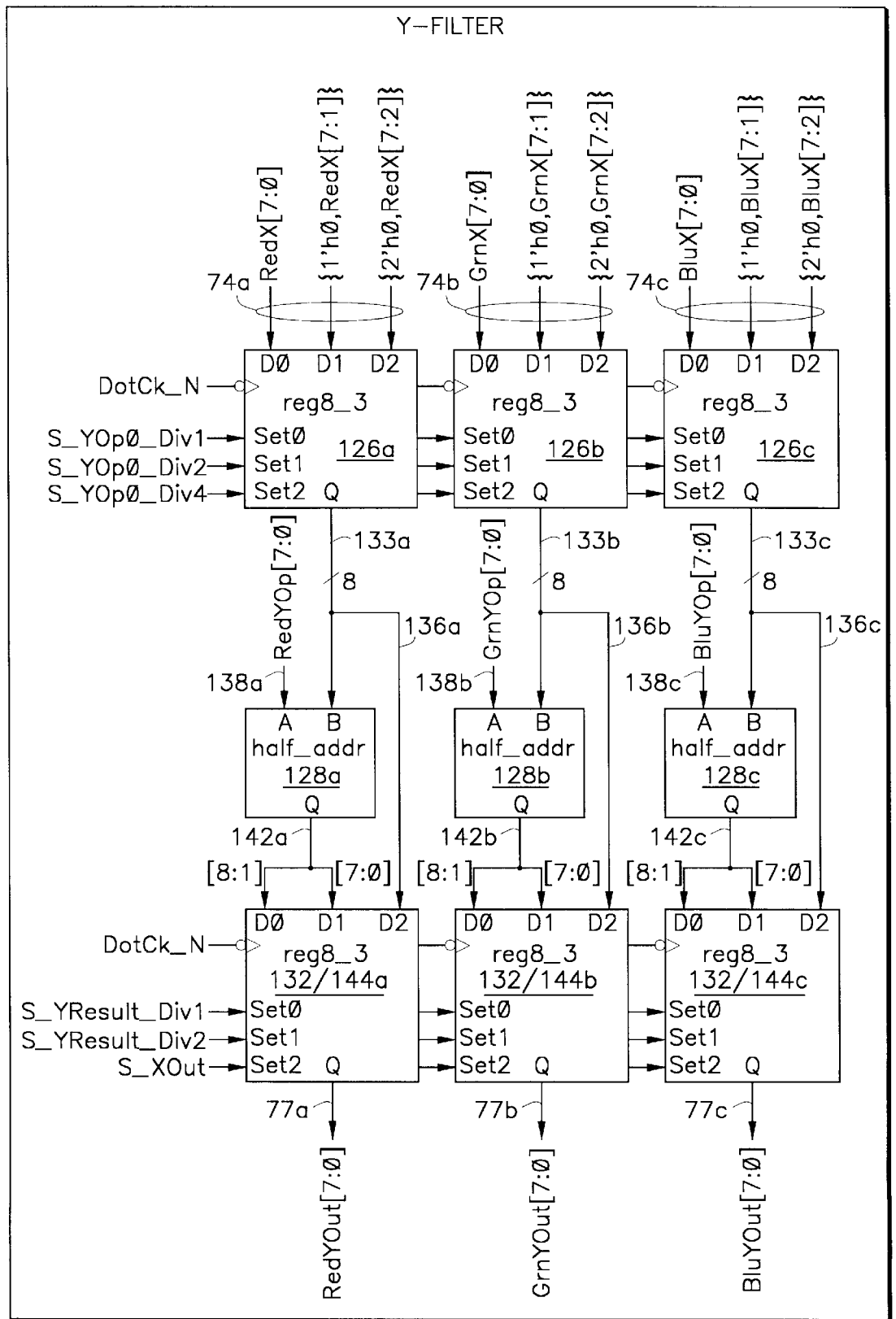

A possible implementation of the y-filter 76 is shown in FIGS. 7A and 7B. The y-filter 76 is closely coupled to the cache 78, which serves as both a filter operand and a speed buffer to allow data to be output at a pixel speed of about 45 MHz (from a speed of approximately 135 MHz).

With reference to FIGS. 7A and 7B, the x-filter 76 includes a programmable divide mechanism 126 configured to divide the input data values by 1, 2, or 4. In other words, the divider passes the value straight through, divides the intensity of each pixel in half, or divides the intensity of each pixel by 4.

The output [7:0], denoted by reference numeral 134, from the programmable divide mechanism 126 is forwarded concurrently to both a half adder 128 and a MUX 132, as indicated by respective reference arrows 134, 136. The half adder 128 is essentially an eight bit adder in the preferred embodiment. The half adder 128 combines a previous line that is transmitted from the cache 78, as indicated by reference arrow 138, with a current line from the programmable divide mechanism 126 in order to generate average data 142. In the preferred embodiment, the average data 142 is produced with an eight bit addition of each component (r, g, b) resulting in a nine bit value. The least significant bit (LSB) is then discarded.

The average data 142 (minus the LSB) is sent to the MUX 132. The MUX 132 is controlled to select filter data 142 or nonfiltered data 136 and to provide the selected data to a programmable divide mechanism 144, as indicated by reference arrow 143. The programmable divide mechanism 144 divides the data stream 143 by one or two, in the preferred embodiment, to generate the data stream 77 to the cache 78. The cache 78 receives the data stream 77 at the pixel clock rate of about 135 MHz and produces a data stream 84 at about 45 MHz.

The y-filter 76 is a much more complex operation than the x-filter, although they are similar in the base function (see FIG. 4) that they perform. The y-filter 76 uses the data being output by the x-filter 72 as one input and the contents of the cache 78 as the other. In this manner the cache 78 acts as a type of accumulation buffer which contains the intermediate and then final results of the filtering function. It is possible to pass the x output values straight to the cache 78 as well as passing this value divided by 2 or 4. It is also possible to combine fractional proportions of the x-filter output with the current contents of the cache 78.

The operations that are supported by the y-filter 76 are indicated in Table B set forth hereafter.

TABLE B

| Operations Of Y-Filter | | |
|---|---|---|
| (a) XOp[n] | -> | Cache[n] |
| (b) (XOp[n]/2) | -> | Cache[n] |
| (c) (XOp[n]/4) | -> | Cache[n] |
| (d) XOp[n] + Cache[n] | -> | Cache[n] |
| (e) (XOp[n]/2) + Cache[n] | -> | Cache[n] |
| (f) (XOp[n]/4) + Cache[n] | -> | Cache[n] |
| (g) XOp[n] + (Cache[n]/2) | -> | Cache[n] |
| (h) (XOp[n]/2) + (Cache[n]/2) | -> | Cache[n] |
| (i) (XOp[n]/4) + (Cache[n]/2) | -> | Cache[n] |

In Table B, the symbols and notations are defined as follows: XOp[n] represents the output of the x-filter 72 at output pixel n; Cache[n] represents the current contents of the accumulation cache at pixel location n; and r→Cache[n] represents the result of operation r replaces the contents of the accumulation cache at location n.

Using the foregoing functions, it is possible to implement the following six scaling operations: (a) 1:1 scaling without antiflicker filtering; (b) 1:1 scaling with antiflicker filtering; (c) 3:2 scaling without antiflicker filtering; (d) 3:2 scaling with antiflicker filtering; (e) 2:1 scaling without antiflicker filtering; and (f) 2:1 scaling with antiflicker filtering.

The antiflicker filter is necessary due to the interlaced nature of the video signal 21. Given a one pixel horizontal line, the video display will only show that line on every other field. Since this occurs at only about 30 Hz, it generates a very objectional flickering when it occurs. This does not usually occur in normal video, as the image is constantly changing and rarely contains one pixel line. In a computer generated image, however, this predicament is a rather common occurrence.

Figure 8:
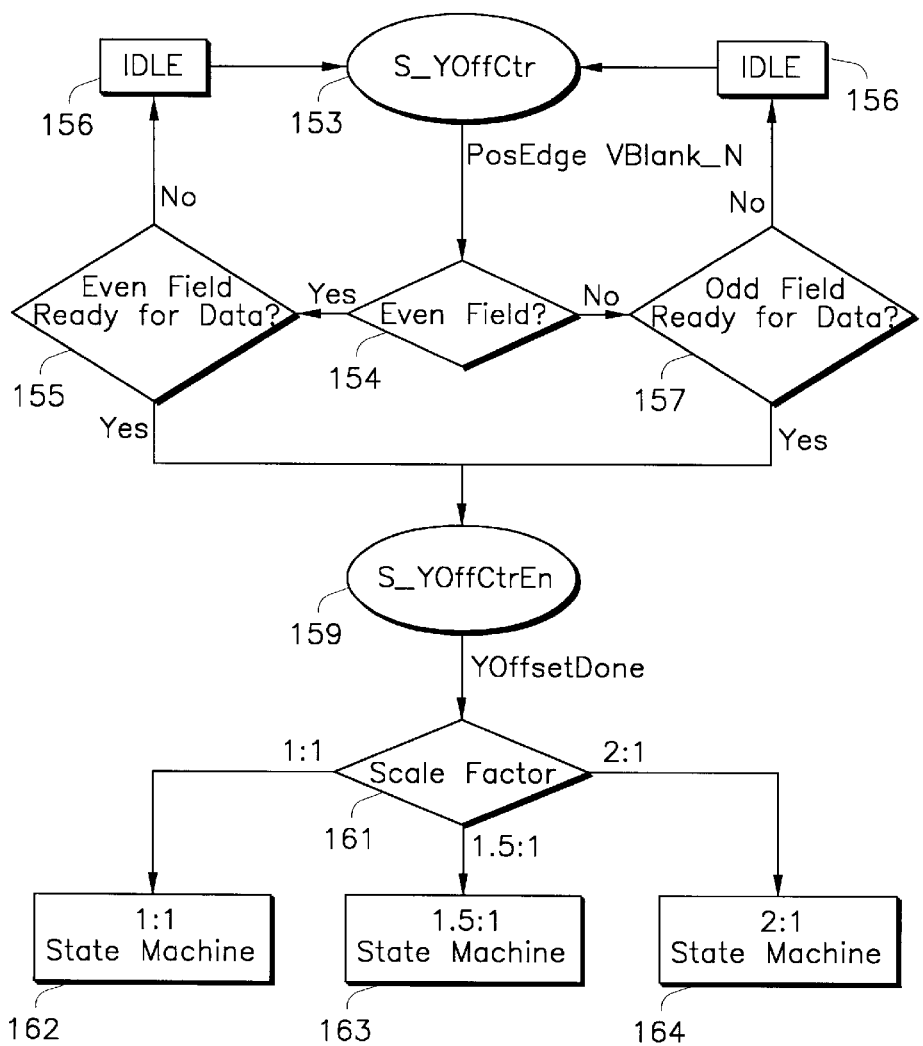
FIG. 8 is a state diagram of a possible implementation of the y-filter of FIGS. 3 and 7.

The y-filter 76 (FIG. 7A and 7B) is controlled by any suitable logic. In the preferred embodiment, the y-filter 76 is controlled by a y-filter state machine 152 that is illustrated in FIG. 8. The notation utilized in the y-filter state machine 152 of FIG. 8 is defined in Table C hereafter.

TABLE C

| Y-Filter State Machine Notation | |
|---|---|
| S_YOp0_Div1=TRUE | Y Op 0 is passed straight through |
| S_YOp0_Div2=TRUE | Y Op 0 is divided by 2 |
| S_YOp0_Div4=TRUE | Y Op 0 is divided by 4 |

TABLE C-continued

Y-Filter State Machine Notation

| | |
|---|---|
| S_YResult_Div1=TRUE | Send result of addition back to cache |
| S_YResult_Div2=TRUE | Send result/2 of addition back to cache |
| S_XOut=TRUE | Send Y Op 0 to cache |
| S_YOffCtrEn=TRUE | Enable Y Offset counter |
| S_YCountEn=TRUE | Enable Y position counter |

Figure 9:
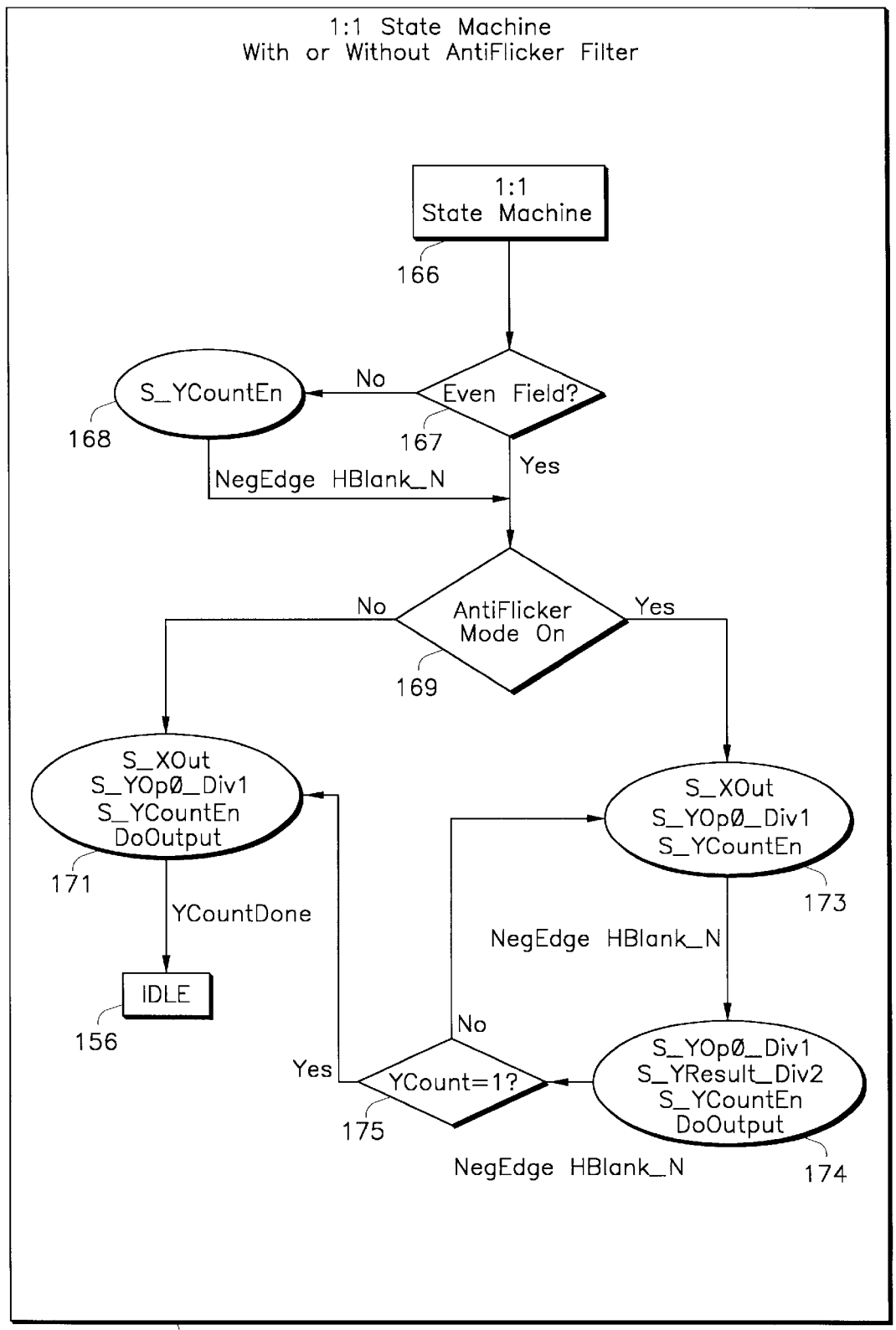
FIG. 9 is a state diagram of a possible implementation of a 1:1 state machine in the y-filter of FIG. 8 that can be configured to operate with or without an antiflickering filter.

The first function of the y-filter 76 is to control the output of the image to only allow writing to the field memory 86 when it is not being read. Starting from the idle state 156, the state machine 152 waits for the positive edge of the vertical blank (vblank) signal, which shows that the graphics device is beginning to output data to the upper left corner of the screen. If the next field to be output in the field memory 86 is not ready, the state machine 152 immediately returns to the idle condition 156 to await the next full scan of the graphics system, via either states 153, 154, 157 or states 153, 154, 155. If data is required in the current output field, then state 159 is entered, from either state 155 or state 157. When the offset counter has counted down at state 159, the graphics pointer is at the first line that will be output to the field memory 86, and the state 161 determines the state machine 162–164 to be used for the actual output, based on the selected scaling factor. FIG. 9 shows a state diagram 162 corresponding with the 1:1 state machine 162 in the y-filter state machine 152 (FIG. 7A and 7B). The 1:1 state machine 162 can be configured to implement an antiflicker filter or not, and it operates as follows. The first task of the 1:1 state machine 162 is to determine the need for skipping the first line of the designated output area, as indicated by state 167. If an even field is being output, then line 0 (relative to the offset point) will be the first line output, and state 167 transfers to state 169. If an odd field is output, it is necessary to skip the first line, and state 167 transfers to state 168, which skips the first line and then transfers to state 169.

At this point, as indicated at state 169, a determination is made as to whether any antiflicker filtering is necessary. If not, then the data is passed straight through to the field memory 86, as indicated at state 171, until the last line has been output, at which time the state reverts to the idle state 156 (FIG. 8). If the antiflicker filter is enabled, a line is accumulated in the accumulation cache 78, pursuant to state 173. On the next line, in accordance with state 174, the contents of the accumulation cache 78 are combined with the new line of data to give an average of the two lines, and the resultant data is output to the field memory 86. The foregoing process continues until the end of the output area is reached, at which point the state machine 162 returns to the idle condition at state 172 by way of state 171.

Figure 10:
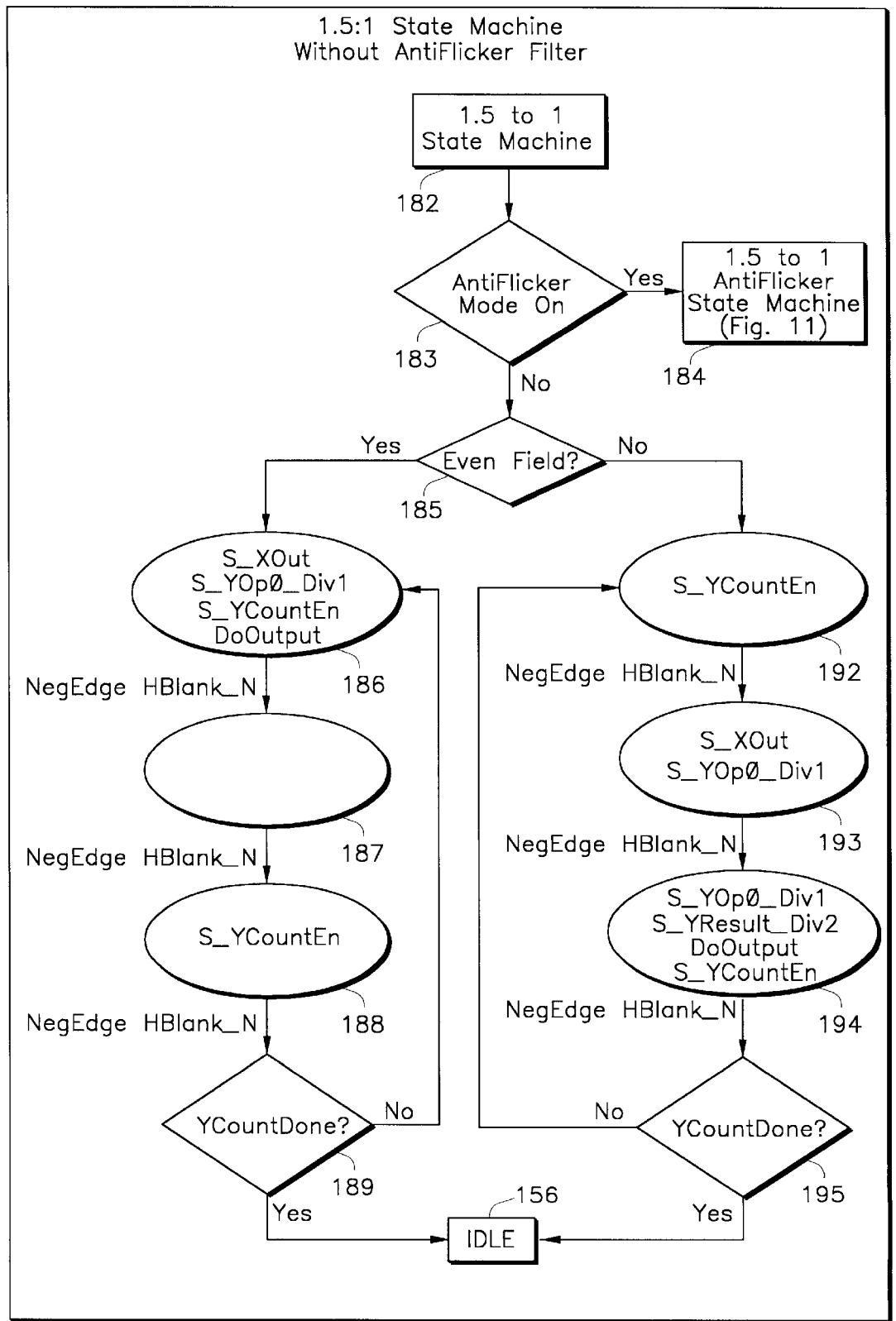
FIG. 10 is a state diagram of a possible implementation of a 1.5:1 state machine without an antiflicker filter in the y-filter of FIG. 8.

FIG. 10 illustrates a 1.5:1 state machine 163' without an antiflicker filter in the y-filter state machine 152 (FIG. 7A and 7B). The 1.5:1 state machine 163' without the antiflicker filter is described hereafter.

The 1.5:1 state machine 163' begins by determining if the flicker filter should be used, as indicated at state 183. If so, the state machine 163' proceeds to the 1.5:1 antiflicker state machine 163" (FIG. 11), as indicated by state 184. If not, then state 183 transfers to state 185.

At state 185, the output field is tested. If an even field is being output, then state 185 transfers to successive states 186–189. In the successive states 186–189, the first line is output unmodified, the next line is completely ignored, and the third line is ignored, except to decrement the y counter. The aforementioned process is repeated until the end of the y area is reached.

If an odd field is to be output, then state 185 transfers to successive states 192–195. In successive states 192–195, the first line is skipped, the next line is stored in the accumulation cache 78, and the third line is averaged with the second line and output. If the y counter has counted all the way down, as indicated at state 195, then the state machine 163' exits to the idle condition at state 156 (FIG. 8). Otherwise, the cycle repeats.

Figure 11:
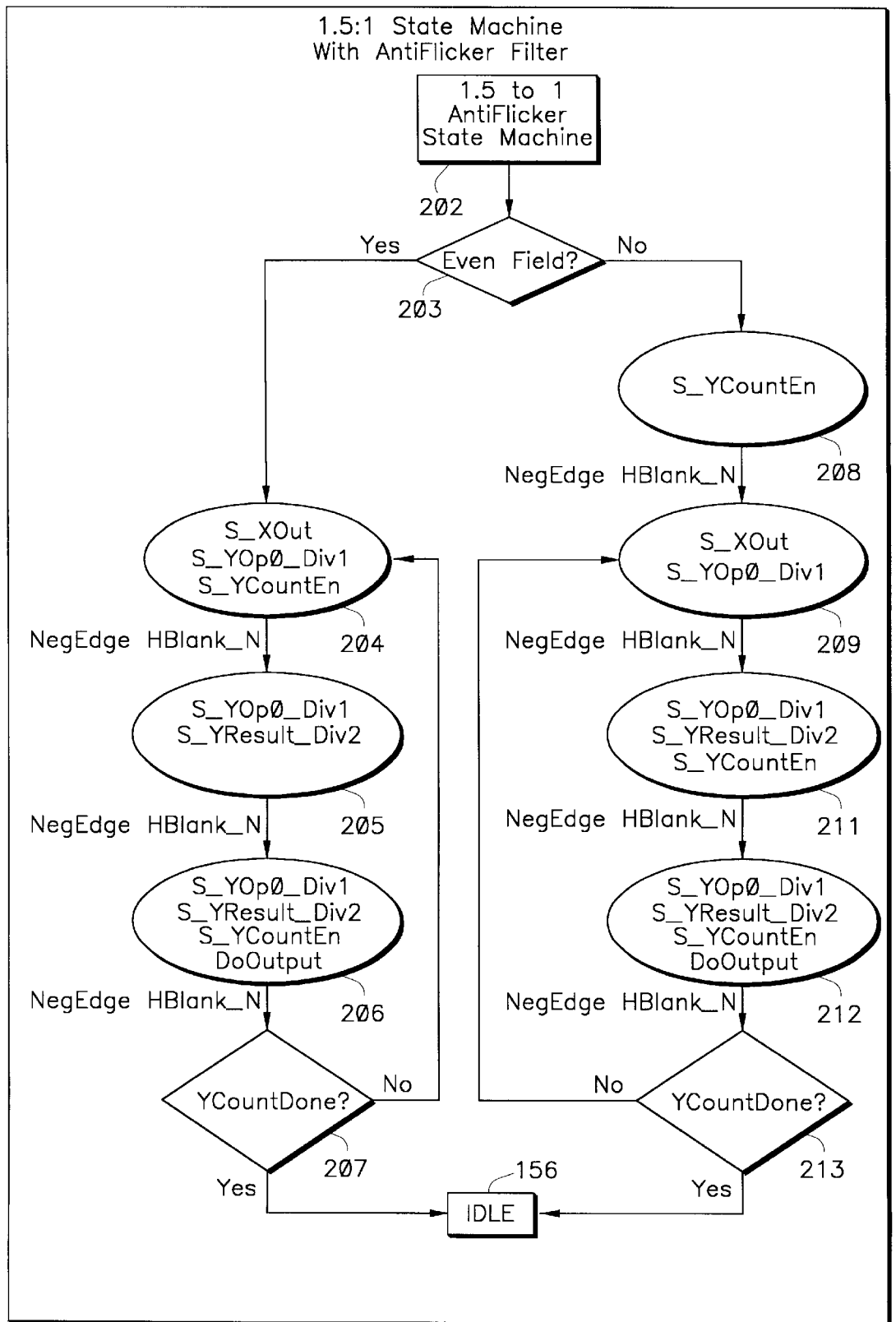
FIG. 11 is a state diagram of a possible implementation of a 1.5:1 state machine with an antiflicker filter in the y-filter of FIG. 8.

FIG. 11 illustrates a 1.5:1 state machine 163" with an antiflicker filter that is implemented in the y-filter state machine 152 (FIG. 8). This state machine 163" operates as follows.

Beginning at a test for even field at a state 203, the state machine 163" splits into separate paths. For an even field, the first line is accumulated into the cache 78, pursuant to state 204. The second line is then accumulated using ½ of the input line plus the value in the cache, in accordance with state 205. This results in a value in the accumulation cache 78 of ½ of the first line plus ¼ of the second line. Finally, ¼ of the value of the third line is accumulated into the cache 78, via state 206. The foregoing process continues until the end of the image has been reached, pursuant to state 207, at which point control returns to the idle state 156 (FIG. 8). If an odd field is chosen, the first line is ignored, in accordance with state 208. The next line is loaded into the accumulation cache 78 via state 209. Next, ½ of the cache value is accumulated with the next line, pursuant to state 211. Lastly, the ½ of the accumulation value is added to the input line at state 212 and the cache is output at state 212. The process is repeated through states 209–213 until the end of the image, at which point the idle state 156 is assumed.

Figure 12:
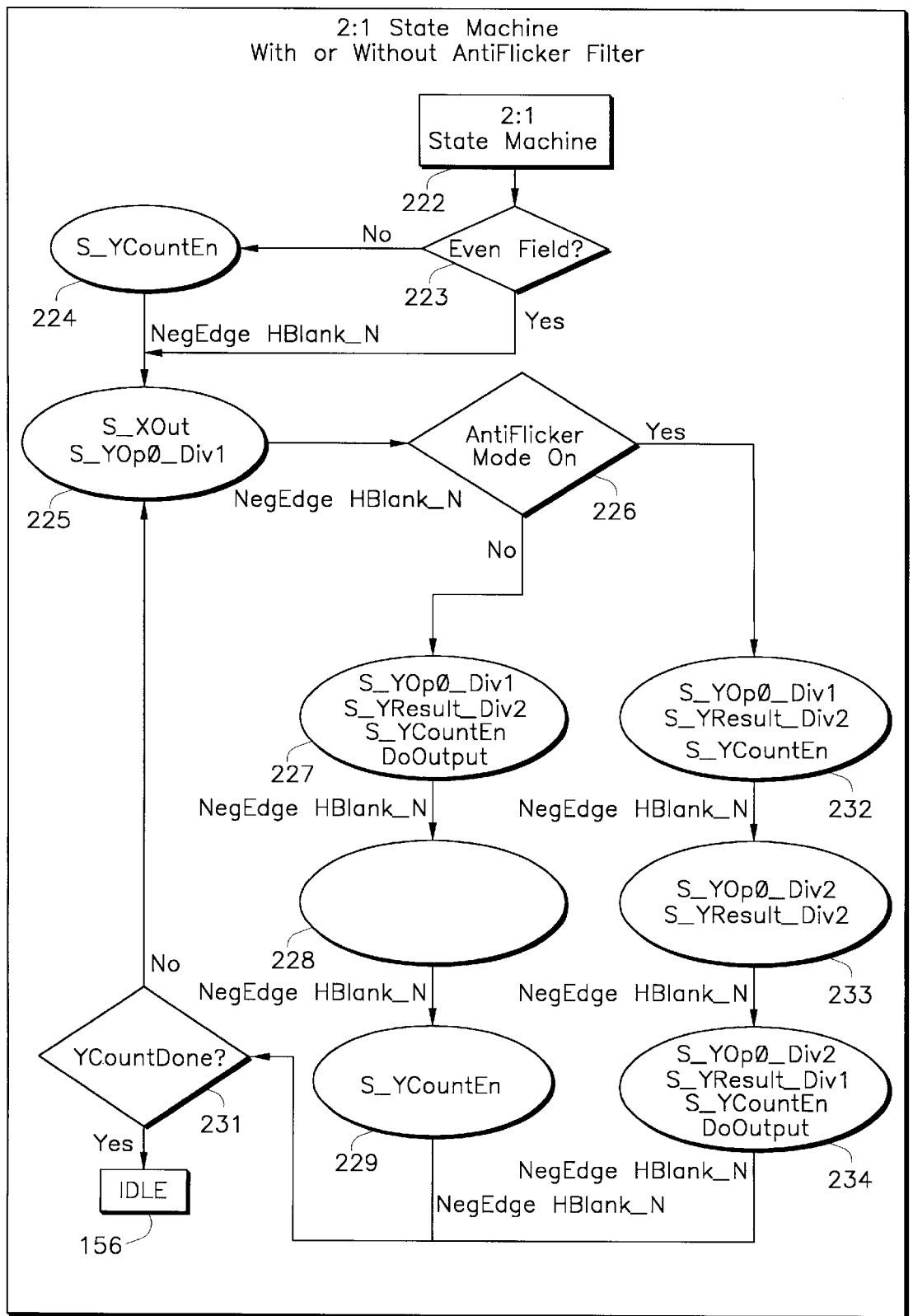
FIG. 12 is a state diagram of a possible implementation of a 2:1 state machine in the y-filter of FIG. 8 that can be configured to operate with or without an antiflickering filter.

FIG. 12 illustrates the 2:1 state machine 164 in the y-filter state machine 152 (FIG. 8). The 2:1 state machine 164 can be configured to implement the antiflicker filter or not, and the 2:1 state machine 164 operates as follows.

The 2:1 state machine 164 also begins with a test for even field, in accordance with state 223. If the output image is not an even field image, then the first line is ignored, pursuant to state 224. If the output image is an even field, then the first line is accumulated at state 225. If the output image is an odd field, then the second line is accumulated at state 225. State 225 transfers to state 226. At state 226, a test is performed to determine if the flicker filter is enabled. If the flicker filter is not enabled, or off, then the next line is averaged with the cache value and the result is output at state 227. Moreover, the next two lines are ignored at states 228–229.

If the flicker filter is enabled as determined at state 226, then the second line is averaged with the first at state 232, ¼ of the value of the next line is then added to ½ of the cache value at state 233, and ¼ of the last line is added to the cache value and the cache line is output at state 234.

The video data 21 that is output from the video interface system 40 (FIG. 2) is illustrated by way of image maps in FIGS. 13–15. In FIGS. 13–15, the following symbols are utilized: the symbol "o" represents data from the noninterlaced graphics signal 64b (FIG. 2) from the graphics system 14; the symbol "X" represents averaged data 142 (FIG. 7); and the symbol "Ⓧ" represents the video data 21 that is output.

Figure 14B:
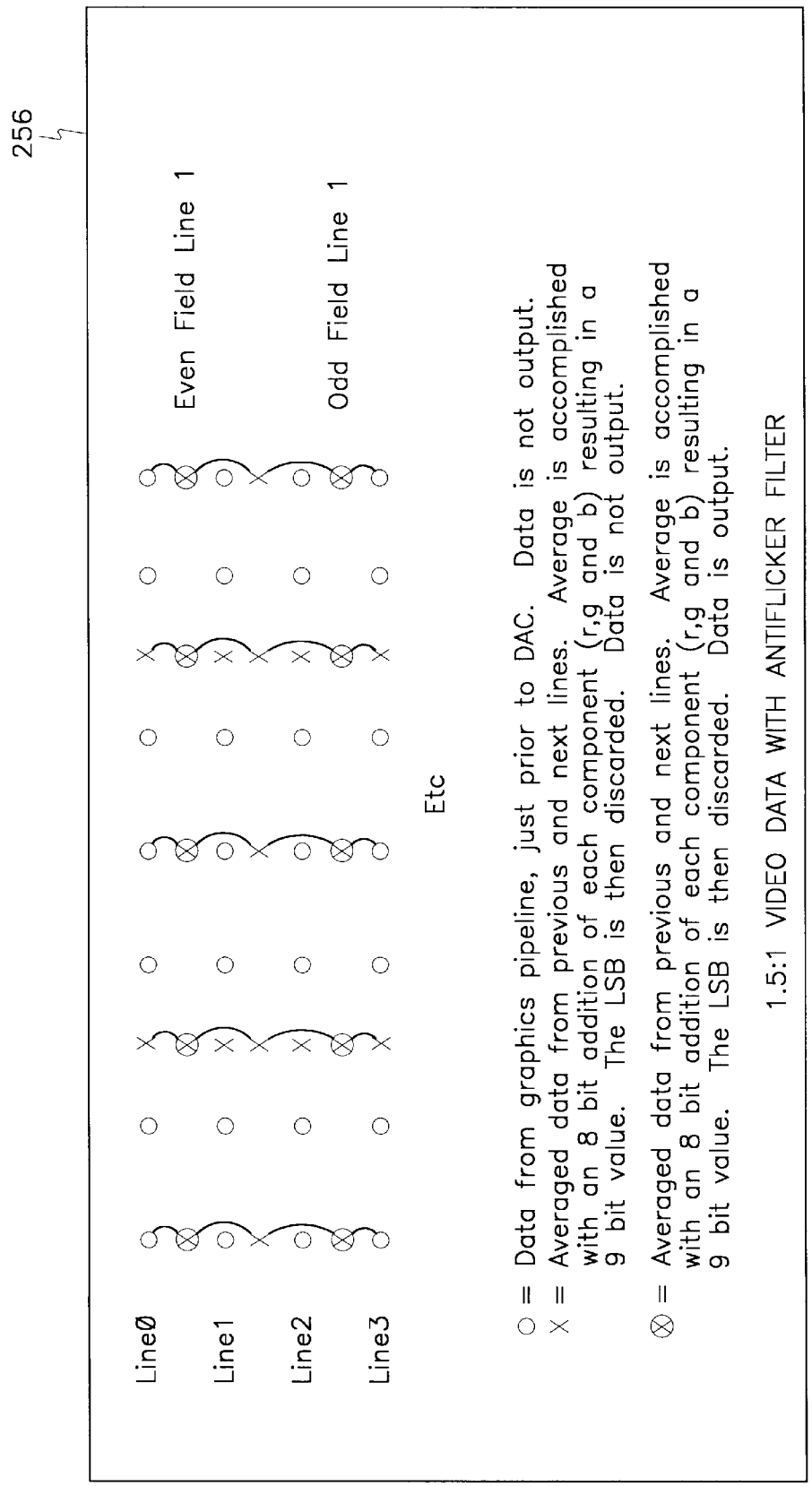
FIG. 14B is a schematic diagram showing 1.5:1 video data that is output by the video interface system of FIG. 2 when the 1.5:1 state machine of FIG. 11 with the antiflicker filter is employed.

More specifically, FIGS. 13A and 13B show respective image maps 248, 252 corresponding with a 1:1 video signal 21 without the antiflicker filter and a 1:1 video signal 21 with the antiflicker filter. FIGS. 14A and 14B show respective image maps 254, 256 corresponding with a 1.5:1 video signal 21 without the antiflicker filter and a 1.5:1 video signal 21 with the antiflicker filter. FIGS. 15A and 15B show respective image maps 258, 262 corresponding with a 2:1 video signal 21 without the antiflicker filter and a 2:1 video signal 21 with the antiflicker filter.

It will be obvious to those skilled in the art that many modifications can be made to the preferred embodiment as described above without departing from the spirit and scope of the present invention. The disclosures and description are intended to be illustrative and any such modifications are intended to be included herein within the scope of the present invention, as is defined in the following claims. Finally, in the claims hereafter, the structures, materials, acts, and equivalents of all means-plus-function elements and all step-plus-function elements are intended to include any and all structures, materials, or acts for performing the specified functions.

Wherefore, the following is claimed:

1. A system for producing an interlaced video signal from a noninterlaced graphics signal from a computer, comprising:
   a processor;
   a graphics system interconnected with said processor, said graphics system comprising:
      an accelerator configured to process primitives from said processor and produce pixel values;
      a frame buffer adapted to receive and store said pixel values from said accelerator;
      a decoder configured to generate and combine timing signals with said pixel values from said frame buffer to produce said noninterlaced graphics signal;
      a digital-to-analog converter configured to receive said graphics signal and produce a analog noninterlaced graphics signal for driving a computer graphics display,
      wherein a video interface is connected to said decoder for receiving said digital noninterlaced graphics signal therefrom; and
   said video interface configured to receive a digitized noninterlaced graphics signal from said graphics system and to convert said graphics signal into an analog interlaced video signal.

2. The system of claim 1, wherein said noninterlaced graphics signal is characterized by a higher resolution and higher frequency than said analog interlaced video signal.

3. The system of claim 1, wherein said analog interlaced video signal has a pixel frequency of about 27 MHz and said noninterlaced graphics signal has a pixel frequency of a pixel clock associated with said graphics system.

4. The system of claim 1, wherein said analog interlaced video signal has a full image update rate of about 30 Hz.

5. The system of claim 1, wherein said analog interlaced video signal has a full image update rate of about 25 Hz.

6. The system of claim 1, further comprising an antiflicker filter associated with said video interface, said antiflicker filter configured to combine pixel values corresponding with successive horizontal lines in an image represented by said digitized noninterlaced graphics signal in order to create data for said interlaced video signal and modify said interlaced video signal to produce said image without flicker.

7. A system for producing an interlaced video signal from a noninterlaced graphics signal from a computer, comprising:
   a processor;
   a graphics system interconnected with said processor; and
   a video interface configured to receive a digitized noninterlaced graphics signal from said graphics system and to convert said graphics signal into an analog interlaced video signal, wherein said video interface comprises:
      an x-filter configured to receive said graphics signal and configured to scale an x-dimension of an image represented by said graphics signal;
      a y-filter connected to said x-filter, said y-filter configured to scale a y-dimension of an image represented by said graphics signal;
      a cache connected to said y-filter, said cache for receiving data from said y-filter at a first rate and for providing data to said y-filter;
      a field memory for receiving data from said cache at a second rate that is slower than said first rate; and
      a video encoder for receiving data from said field memory at a third rate that is slower than said first and second rates and for providing said analog interlaced video signal.

8. The system of claim 7, wherein said first rate is about 135 MHz, said second rate is about 45 MHz, and said third rate is about 27 MHz.

9. The system of claim 7, wherein said first rate is about 135 MHz, said second rate is about 45 MHz, and said third rate is about 25 MHz.

10. A method for producing an analog interlaced video signal from a computer having a processor interconnected with a graphics system, comprising the steps of:
    receiving a noninterlaced graphics signal from the graphics system;
    storing said graphics signal at a first rate in a cache;
    transferring said graphics signal from said cache at a second rate that is slower than said first rate to a field memory;
    transferring said graphics signal from said field memory at a third rate that is slower than said first and second rates to produce a video signal; and
    converting said noninterlaced graphics signal into said analog interlaced video signal.

11. The method of claim 10, further comprising the step of utilizing said noninterlaced graphics signal with a higher resolution and higher frequency than said analog interlaced video signal.

12. The method of claim 10, wherein said graphics system comprises:
    processing primitives from said processor to produce pixel values;
    combining timing signals with said pixel values to produce said noninterlaced graphics signal; and
    producing a nonanalog interlaced graphics signal for driving a computer graphics display from said noninterlaced graphics signal.

13. The method of claim 10, further comprising the step of providing said analog interlaced video signal with a frequency of about 27 MHz and said noninterlaced graphics signal with a frequency of about 135 MHz.

14. The method of claim 10, further comprising the step of providing said analog interlaced video signal with a full image update rate of about 30 Hz.

15. The method of claim 10, further comprising the step of providing said analog interlaced video signal with a full image update rate of about 25 Hz.

16. The method of claim 10, further comprising the step of scaling an x-dimension of an image represented by said graphics signal.

17. The method of claim 10, further comprising the step of scaling a y-dimension of an image represented by said graphics signal.

18. The method of claim 10, further comprising the step of combining pixel values corresponding with successive horizontal lines in an image represented by said digitized noninterlaced graphics signal in order to modify said interlaced video signal to produce said image without flicker.

19. The method of claim 10, wherein said noninterlaced graphics signal is representative of successive image frames, and further comprising the step of producing said analog interlaced video signal from subset of said frames.

20. The method of claim 10, wherein said first rate is about 135 MHz, said second rate is about 45 MHz, and said third rate is about 27 MHz.

21. The method of claim 10, wherein said first rate is about 135 MHz, said second rate is about 45 MHz, and said third rate is about 25 MHz.

22. The method of claim 10, further comprising the steps of, when transferring said graphics signal from said field memory to produce said digital video signal:

transferring odd and even lines alternately; and preventing transfer of odd and even lines from said cache to said field memory when odd and even lines are being transferred out from said field memory, respectively, by disregarding said odd and even lines from said cache, respectively.

* * * * *